Nov. 2, 1971  W. E. BRANDAU  3,616,691
MISSION CAPABILITY INDICATING SYSTEM
Filed March 26, 1969  8 Sheets-Sheet 8

INVENTOR.
WILLIAM E. BRANDAU
BY
ATTORNEY

# United States Patent Office 3,616,691
Patented Nov. 2, 1971

3,616,691
MISSION CAPABILITY INDICATING SYSTEM
William E. Brandau, Westwood, N.J., assignor to
The Bendix Corporation
Filed Mar. 26, 1969, Ser. No. 810,668
Int. Cl. G01c *21/00*
U.S. Cl. 73—178 H
19 Claims

ABSTRACT OF THE DISCLOSURE

A computer especially adapted for use in helicopters for determining prior to takeoff if the engine has sufficient capability to complete the assigned mission. The computer senses ambient conditions and actual engine torque, and computes percent of maximum torque output to predict maximum cargo weight, maximum range, stall speed and best operational airspeeds for maximum range and endurance.

BACKGROUND OF THE INVENTION

Field of the invention

This invention relates to a system for indicating turbine engine power capability and more particularly to a system used in helicopters to predict mission capability.

Description of the prior art

Figure 1:
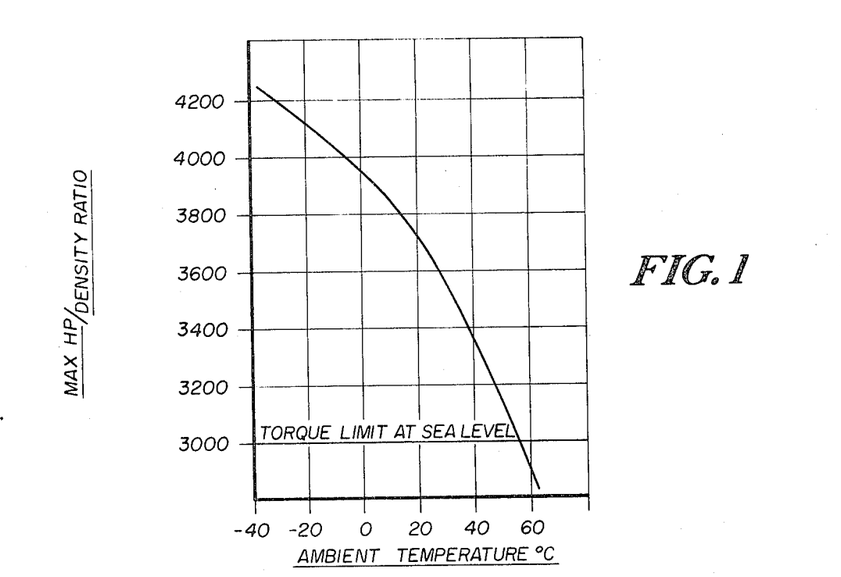
FIG. 1 is a graph showing the relationship between ambient temperature and the ratio of maximum engine horsepower to density ratio for a typical helicopter turbine engine.

Heretofore, it has been difficult for helicopter pilots to determine prior to flight if sufficient engine torque is available for sustained flight. Turbine engines used in helicopters have rated torque outputs which vary with ambient pressure, temperature and humidity so that the altitude, temperature and humidity at which a helicopter operates is critical in predicting mission capability. Rated engine torque output decreases as the helicopter gains altitude and increases as the ambient temperature decreases. FIG. 1 shows the relationship between ambient temperature and the ratio of maximum engine horsepower to density ratio. Density ratio is the ratio of static pressure to standard sea level pressure corrected for temperature variation.

Figure 2:
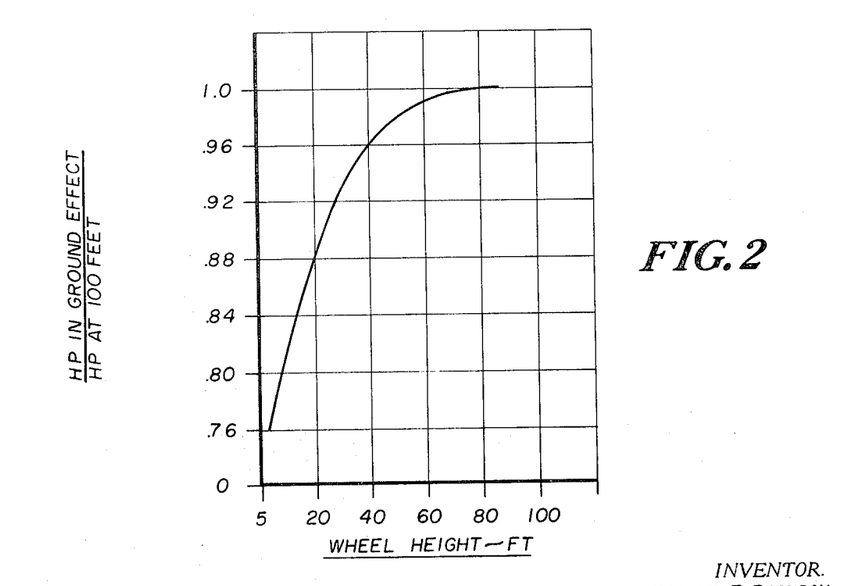
FIG. 2 is a graph showing the effect of a helicopter's proximity to the ground on the power required to hover.

Helicopters are also susceptible to ground effect. The proximity of a helicopter to the ground affects the lift capability of its rotors and this capability is greatly decreased as the helicopter gains altitude and passes out of ground effect. Because of this, a helicopter pilot could take off and shortly thereafter discover he does not have sufficient power for flight at an altitude out of ground effect. FIG. 2 shows the relationship between wheel height and the ratio of horsepower required to hover in ground effect to the horsepower required to hover at 100 feet.

If a mission destination is at a substantially higher altitude than the point of departure it is possible that the helicopter may not be able to achieve a safe descent at the destination. In the past it was necessary for pilots manually to calculate the maximum available torque at various altitudes and temperatures to determine maximum cargo weight and the possibility of hovering at all required altitudes.

Prior art devices have been used to calculate actual engine horsepower, remaining horsepower or percentage of maximum remaining horsepower as in U.S. Pat. No. 3,272,004. These devices were used by the pilot to monitor engine performance and to indicate engine reserve capability. The pilot would then determine the mission capability by manual calculations using this information.

No convenient method has been provided to indicate to a pilot prior to take off if his cargo load and mission destination are within the capability of the engines.

SUMMARY OF THE INVENTION

The present invention senses ambient pressure and temperature and produces a signal corresponding to the rated engine torque which is a function of the sensed parameters. Means are provided to adjust for the effects of humidity, subnormal engine operation and also to limit the maximum torque output to a level which can be safely produced by the helicopter engines. The invention also senses actual engine torque and compares it with the maximum torque to calculate the percent of maximum torque. A destination control panel is provided for inserting destination parameters of altitude, temperature and fuel reserve so that the computer can determine the available power at the mission destination. The invention computes and displays percent of maximum torque, actual torque, maximum cargo weight, maximum range, stall speed, and the best operating speeds for both maximum range and maximum endurance.

Using a percent maximum torque indicator the pilot may cause the helicopter to lift-off with full assurance of sufficient capability to complete the mission.

One object of the present invention is to display actual engine torque, percent of maximum torque, helicopter stall speed, maximum helicopter range, maximum cargo weight, and actual cargo weight.

Another object of the invention is to indicate the optimum airspeeds for both maximum range and maximum endurance.

Another object of the invention is to provide a method for determining if a helicopter has sufficient power for sustained flight.

Another object of the invention is to determine if the helicopter is capable of hovering and landing safely at the destination.

The foregoing and other objects and advantages of the invention will appear more fully hereinafter from a consideration of the detailed description which follows, taken together with the accompanying drawings wherein one embodiment of the invention is illustrated by way of example.

DESCRIPTION OF THE DRAWINGS

In the drawings in which corresponding numerals indicate corresponding parts in their respective figures.

DESCRIPTION OF THE INVENTION

The present invention is described in connection with a system for computing mission capability of a helicopter using two turbine engines. It should be understood that applicable portions of the system may be used to monitor and predict the performance of any turbine engine.

The percent of maximum torque of a turbine engine may be computed by using the following parameters; T2, gas generator compressor inlet temperature; P2, gas generator compressor inlet pressure; humidity; and the actual engine torque. Helicopter turbine engines are essentially constant speed devices so that the torque developed corresponds to the power output of the engine. In helicopters the T2 and P2 parameters are nearly equal to the ambient conditions so that ambient temperature may be used for T2 and static pressure for P2.

Figure 3:
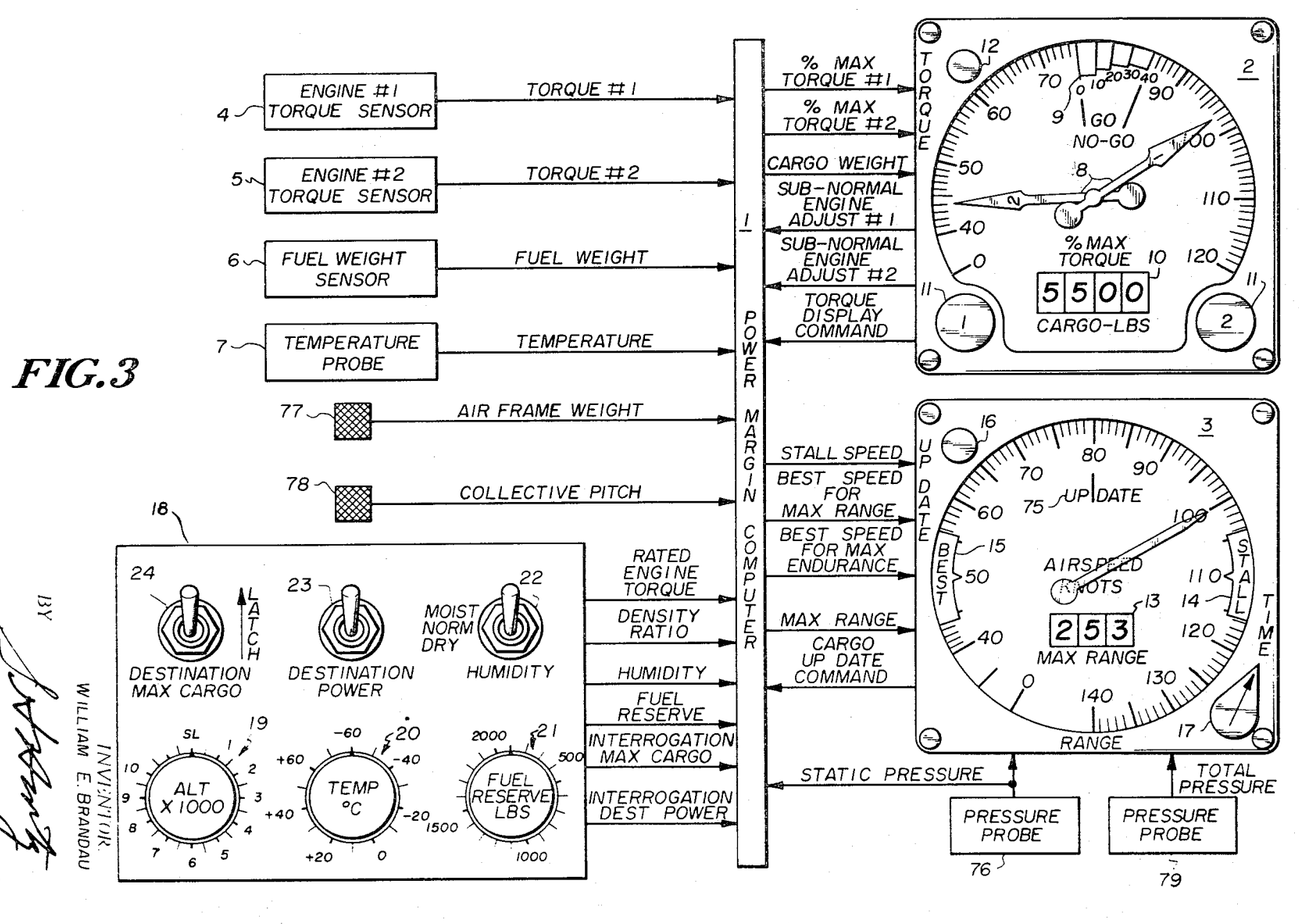
FIG. 3 is a block diagram showing a Mission Capability Indicating System constructed in accordance with the present invention.

Referring to FIG. 3, a pair of torque sensors 4 and 5 provide signal corresponding to the actual engine torque for the two engines to a power margin computer 1. A fuel weight sensor 6 provides a signal to the power margin computer corresponding to the remaining fuel weight. A temperature probe 7 senses ambient temperature and provides a signal corresponding thereto to the power margin computer. A pressure probe 76 provides static pressure to the power margin computer. A knob 77 is used to adjust and provide a signal to the power margin computer corresponding to airframe weight. A knob 78 is used to adjust and provide a signal to the power margin computer corresponding to collective pitch.

The power margin computer provides output signals corresponding to cargo weight and percent of maximum torque for each engine to a percent maximum torque indicator 2. Indicator 2 has a pair of pointers 8 for indicating percent of maximum torque for each engine, on a percentage scale having a go, no-go index 9. The go, no-go index has a STOL airspeed background, the purpose of which will be explained later. A digital counter 10 is used to display the cargo weight. Means 11 provide signals to the power margin computer for adjusting for subnormal operation of each engine. A switch 12 is provided to initiate a signal to the power margin computer for causing the computer to provide signals corresponding to actual torque.

The power margin computer also provides signals corresponding to stall speed, maximum range, and best speed for maximum endurance to an airspeed indicator 3. The airspeed indicator is provided with static pressure from pressure probe 76 and total pressure from a pressure probe 79 from which it computes and displays the present airspeed. A digital counter 13 displays maximum range. A movable index 14 responsive to the stall speed signal indicates the stall speed. second movable index 15 is responsive to the best speed signals to indicate either best speed for maximum range or endurance depending on the position of a switch 17. A cargo update switch 16 provides a signal to the power margin computer to cause it to update the actual cargo weight signal. An update light 75 indicates when the cargo update switch should be activated.

A destination control panel 18 provides for manually inserting signals corresponding to destination conditions and for interrogation of the power margin computer. An adjustable means 19 is used to insert nad adjust a signal corresponding to destination altitude. A signal corresponding to destination ambient temperature is inserted and adjusted using an adjustable means 20. An adjustable means 21 is used to insert and adjust a signal corresponding to destination fuel reverse requirements. A three position switch 22 is used to insert a signal corresponding to either moist, normal or dry humidity. A pair of switches 23 and 24 provide means for initiating interrogation commands for destination power nad destination maximum cargo respectively. Switch 24 has provisions for locking in the interrogation position. The destination control panel 18 computes and provides signals to the power margin computer corresponding to the following destination parameters: rated engine torque, density ratio, humidity and fuel reserve. It also provides interrogtion signals for destination maximum cargo and destination power to the power margin computer.

Figure 4:
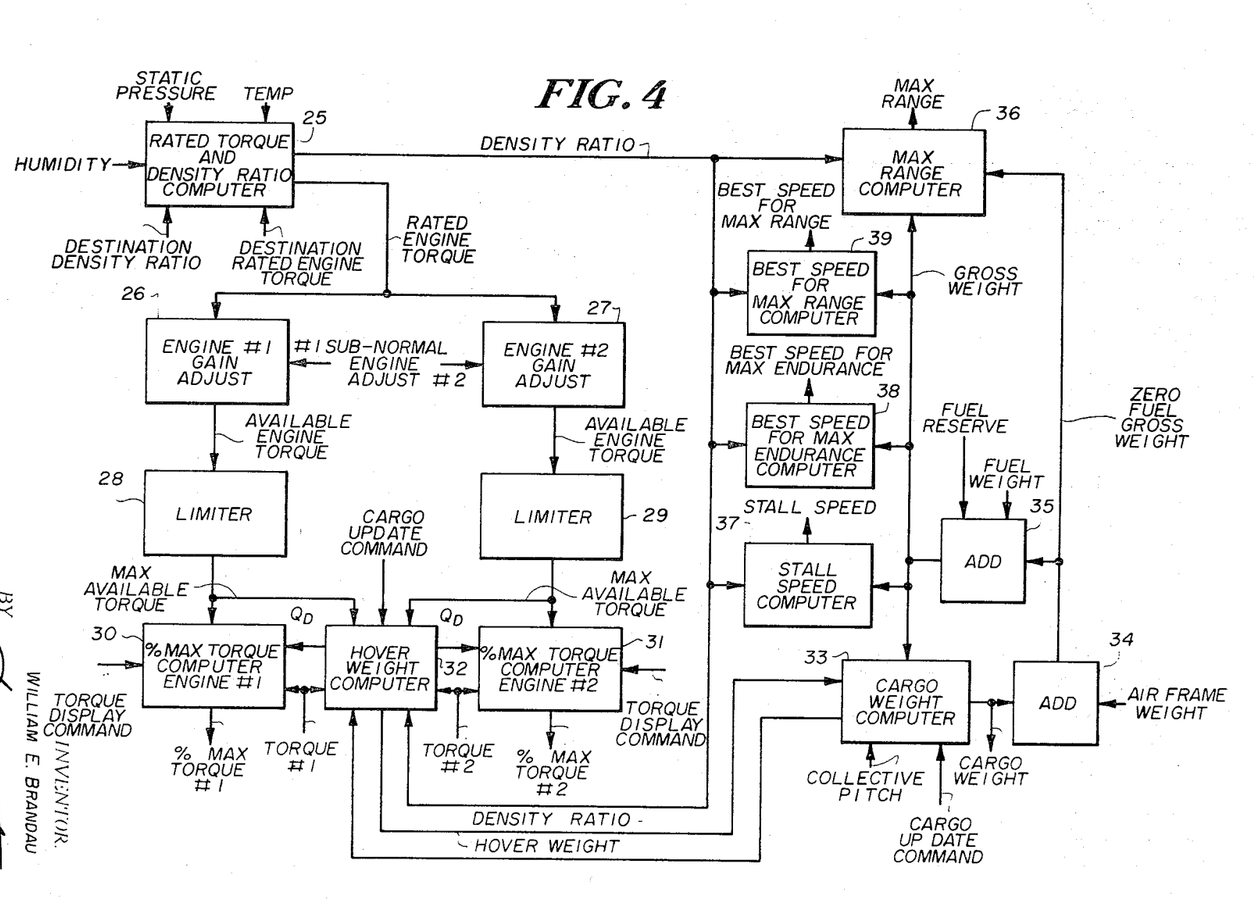
FIG. 4 is a block diagram of the power margin computer shown in FIG. 3.

Referring to FIG. 4 there is shown a block diagram of the power margin computer 1. A rated torque and density ratio computer 25 is responsive to the static pressure, temperature and humidity signals to provide signals corresponding to density ratio and rated engine torque. The torque signal is applied to a pair of gain adjustment devices 26 and 27 which are responsive to the subnormal engine adjustment signals from the percent of maximum torque indicator 2 for compensating for subnormal engine operation. Gain adjustment devices 26 and 27 provide signals corresponding to available engine torque to a pair of limiters 28 and 29 for limiting the available torque signals to a maximum level corresponding to the maximum torque handling capability of the turbine engines. The maximum available torque signals are applied to a pair of percent of maximum torque computers 30 and 31 which are also supplied with the torque signals from the torque sensors 4 and 5. Computers 30 and 31 provide signals corresponding to percent of maximum torque for each engine and are responsive to the torque display command signal for providing actual torque signals in place of the percent of maximum torque signals.

A hover weight computer 32 is responsive to the maximum available torque signals, the density ratio signal and the actual torque signal for each engine for computing a signal corresponding to maximum hover weight. The hover weight computer is responsive to the cargo update command for updating the maximum hover weight signal to an actual hover weight signal. The hover weight computer is also responsive to the destination power interrogation signal from the destination control panel to provide a signal corresponding to destination torque requirement $Q_D$. A cargo weight, that is, gross weight of the aircraft and cargo with zero fuel computer 33 is responsive to the maximum hover weight signal to provide a signal corresponding to maximum cargo weight. An ADD circuit 34 adds the airframe weight signal to the maximum cargo weight signal to provide a signal corresponding to zero fuel gross weight. An ADD circuit 35 adds the fuel weight signal to the zero fuel gross weight signal to provide a signal corresponding to maximum gross weight which is also applied to the cargo weight computer 33 wherein it is compared with the maximum hover weight signal to adjust the cargo weight computer so that the maximum gross weight signal equals the maximum hover weight signal. When the cargo update command is initiated the cargo weight computer output corresponds to actual cargo weight and the maximum gross weight becomes actual gross weight.

A maximum range computer 36 is responsive to the density ratio, actual gross weight and zero fuel gross weight signals to provide a signal corresponding to maximum range. A stall speed computer 37, a best speed for maximum endurance computer 38 and a best speed for maximum range computer 39 are each responsive to the density ratio signal and the actual gross weight signal for providing signals corresponding to stall speed, best speed for maximum endurance and best speed for maximum range respectively.

Figure 5:
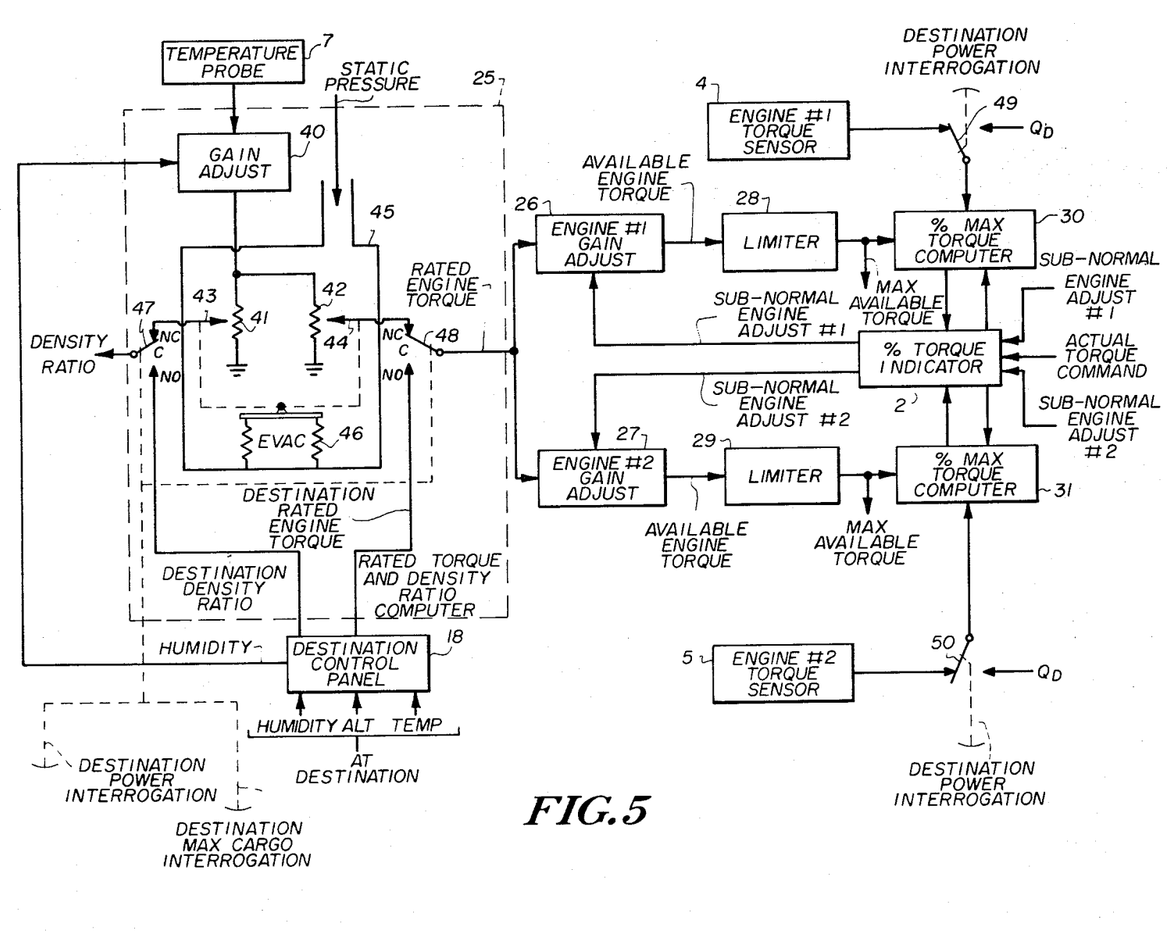
FIG. 5 is a block diagram of a portion of the system shown in FIG. 3 to compute and display percent of maximum torque and actual torque.

Referring to FIG. 5 there is shown a block diagram of a portion of the system used to compute and display percent of maximum torque and actual torque. The signal from the temperature probe 7 is modified by a gain adjust means 40 which is responsive to the humidity signal from control panel 18. Two potentiometers 41 and 42 having wipers 43 and 44 coupled to an evacuated diaphragm 46 are connected to the gain adjust means 40 and are excited by the signal therefrom. Static pressure is supplied to an inlet on a sealed container 45 containing the diaphragm so that the diaphragm expands and contracts in corresponding relation to the static pressure. Thus the wipers 43 and 44 move as a function of static pressure. Potentiometer 42 is contoured to provide a signal corresponding to rated engine torque at ambient conditions when it is excited by a signal corresponding to ambient temperature and the wiper is moved to correspond to static pressure. Potentiometer 41 is contoured to produuce a signal corresponding to density ratio, a ratio of ambient pressure to sea level pressure compensated for temperature variations, when it is excited by a signal corresponding to temperature and the wiper is moved to correspond to static pressure.

Wiper 43 of potentiometer 41 is connected to a normally closed contact of a switch 47 and the wiper of potentiometer 42 is connected to a normally closed contact of a switch 48 having a common terminal connected to gain adjust devices 26 and 27 for adjusting the rated engine torque signal to compensate for subnormal engine operation. Each gain adjustment device is responsive to an adjustment of the subnormal engine adjustment means 11 on the percent of maximum torque indicator 2 as shown in FIG. 3. The gain adjustment devices 26 and 27 have outputs providing signals corresponding to the available engine torque for each engine and connected to limiters 28 and 29 for limiting the signal to a level corresponding to the maximum torque that may be safely produced by the helicopter engines. The limiters have outputs providing signals corresponding to the maximum available torque for each engine and connected to a pair of percent of maximum torque computers 30 and 31. Engine torque sensors 4 and 5 are connected to the corresponding percent of maximum torque computer through switches 49 and 50. The computers divide the actual torque signal by the maximum available torque signal to compute percent of maximum torque for each engine and provide signals corresponding thereto. Each computer has an output connected to the torque indicator 2 which displays percent maximum torque for each engine.

The torque display command switch 12 on the torque indicator 2 is connected to the percent maximum torque computers 30 and 31. Activation of the switch causes the percent maximum torque computers to pass the actual engine torque signal directly to the torque indicator 2 for indicating actual engine torque.

The subnormal engine adjustment is completed while the helicopter is on the ground. The engines are run up to maximum power and the engine adjustment is set for a 100 percent reading on the percent of maximum torque indicator.

Referring to FIG. 2 is is noted that a helicopter may hover within ground effect at a fraction of the torque required to hover out of ground effect. At lift-off a helicopter can hover at 75 percent of the torque required at 100 feet altitude. Thus a pilot can be assured of sufficient torque to hover out of ground effect if he can lift-off at 75 percent of maximum torque as indicated by the go, no-go index on the torque indicator 2.

Figure 6:
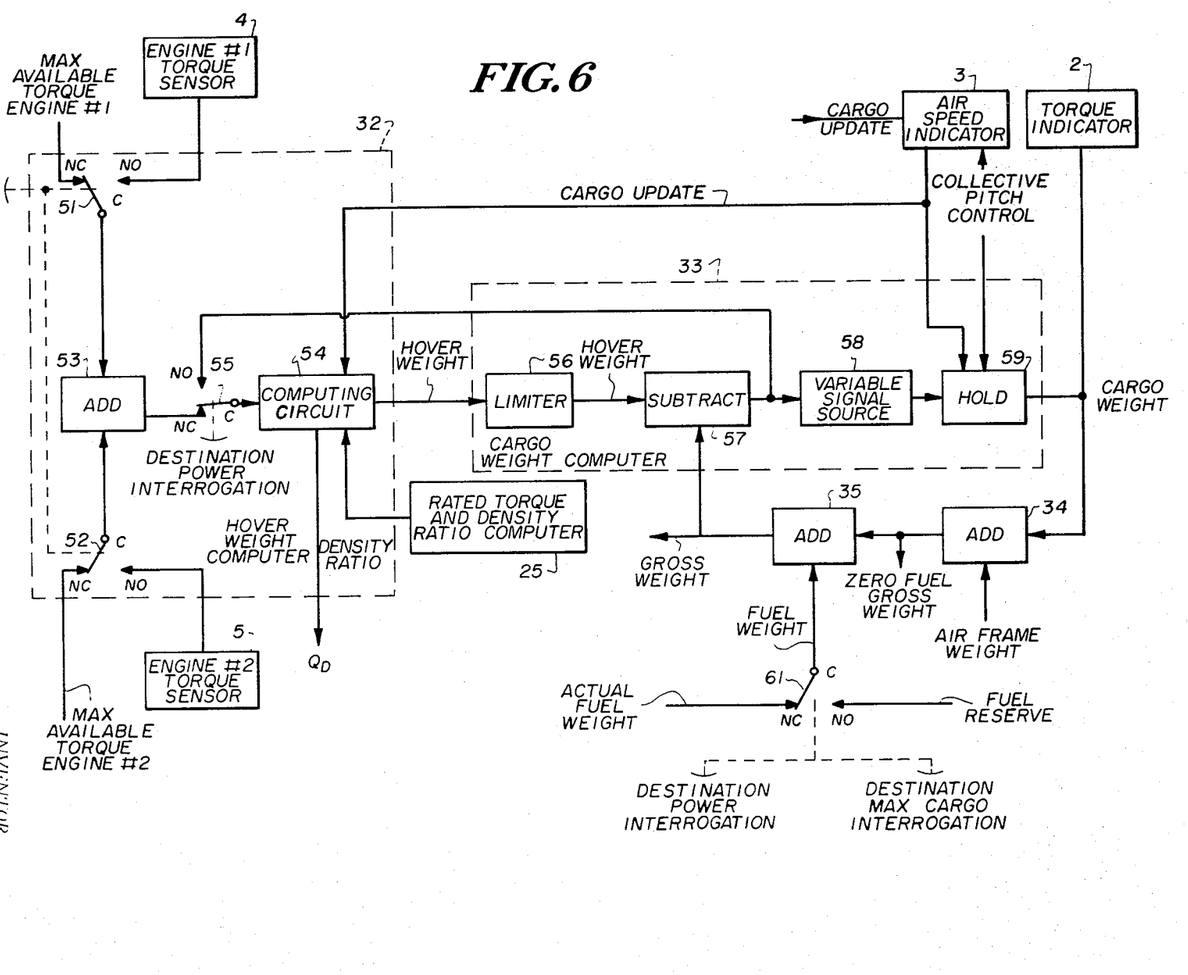
FIG. 6 is a block diagram of a portion of the system shown in FIG. 3 used in conjunction with the portion shown in FIG. 5 to compute and display maximum cargo weight and actual cargo weight.

Referring to FIG. 6 there is shown a block diagram of a portion of the system used to compute and display maximum cargo weight and actual cargo weight. The maximum available torque signals from limiters 28 and 29 in FIG. 5 are connected to normally closed terminals of switches 51 and 52 respectively. The switches have normally open terminals connected to torque sensors 4 and 5 that supply an actual engine torque signal for each engine. The switches 51 and 52 have common terminals connected to an ADD circuit 53 which sums the two signals and has an output that provides a signal corresponding to the total maximum available torque for both engines and is connected to a computing circuit 54 through a normally closed switch 55. Computing circuit 54 is also connected to the rated torque and density ratio computer 25 and is provided with a density ratio signal therefrom.

Computing circuit 54 solves the aerodynamic equation $$Q = RKf(W/R)^{3/2} \qquad (1)$$

for the value W. In the equation Q is the total maximum rated torque, K is a constant for zero helicopter airspeed, R is the density ratio, W is the maximum hover weight of the helicopter at the present values of Q and R. The computing circuit 54 supplies a signal corresponding to the maximum hover weight and is connected to a limiter 56 which limits the maximum hover weight signal to a level not to exceed the maximum gross weight limit of the helicopter.

Limiter 56 has an output connected to a subtraction circuit 57. A variable signal source 58 is connected to an output of subtraction circuit 57 and has an output connected to a hold circuit 59 and supplies a signal thereto corresponding to maximum cargo weight. The hold circuit 59 is responsive to a signal from the collective pitch control or the cargo update command to hold or to release the maximum cargo weight signal. Hold circuit 59 has an output connected to ADD circuit 34 which is supplied with a signal corresponding to airframe weight and sums the two signals to provide a signal corresponding to zero fuel gross weight. Add circuit 34 is connected to another ADD circuit 35 which has a fuel weight input for inserting a signal corresponding to actual fuel weight. The fuel weight input of ADD circuit 35 is connected to a common terminal of a switch 61 having a normally closed terminal connected to the actual fuel weight signal from the fuel weight sensor 6 in FIG. 3. Add circuit 35 sums the fuel weight signal with the zero fuel gross weight signal and provides a maximum gross weight signal which is connected to subtract circuit 57.

The subtract circuit compares the maximum gross weight and maximum hover weight signals and provides a difference signal to the signal source 58 which varies the maximum cargo weight signal until the maximum gross weight signal equals the maximum hover weight signal. The output of hold circuit 59 is connected to the digital counter 10 on torque indicator 2 and provides the cargo weight signal thereto. When the helicopter is on the ground the cargo weight signal corresponds to the maximum cargo weight. Upon lift-off the collective pitch control provides a signal to the hold circuit which is responsive thereto for holding the maximum cargo weight signal at the output of the hold circuit. The collective pitch control signal also causes the update light 75 on indicator 3 to light.

At a convenient time after lift-off the pilot can update the maximum cargo weight to actual cargo weight by depressing the cago update switch 16 while flying at a specified constant airspeed. Computer 54 is connected to the airspeed indicator 3 and is responsive to the cargo update signal and switches the constant K in Equation 1 to a value established for the specified airspeed.

Switches 51 and 52 are also responsive to the cargo update command and switch to the actual engine torque signals from sensor 4 and 5. The computer computes the actual weight by solving Equation 1 using the actual engine torque in place of the maximum available torque and the constant for the specified airspeed. Hold circuit 59 is responsive to the update signal to release the cargo weight signal thus allowing it to update to the actual cargo weight from signal source 58. When the cargo update switch is released the hold circuit holds the actual cargo weight signal which is displayed on the digital counter 10. As the flight progresses the present gross weight signal is continually reduced as the actual fuel weight decreases.

The output of the subtract circuit 57 is connected to a normally open terminal of switch 55. The normally open terminal of switch 61 is connected to the Destination Control Panel 18 and is supplied with the signal corresponding to reserve fuel weight at the destination.

Prior to lift-off the pilot can determine the maximum cargo that may be safely landed at the destination. The pilot must insert destination altitude to simulate the destination static pressure, the destination temperature, and he required reserve fuel weight at the destination. The pilot then interrogates the system by activating the destination maximum cargo switch 24 on the destination control panel 18. Activation of the destination maximum cargo switch causes switches 47 and 48 in FIG. 5 to connect destination density ratio and destination rated engine torque to the system and switch 61 connects the fuel reserve signal to the system. Thus the system is confronted with the destination conditions and the maximum cargo weight then corresponds to the maximum cargo that may be loaded for a safe landing at the destination. The pilot then may determine whether the departure or destination point controls the maximum cargo that may be loaded. If the destination maximum cargo is the restraining value it can be locked into digital counter 10 by moving the destination maximum cargo switch to the latch position. Thus the pilot has readily available the cargo load limit which remains on the display until the cargo update switch is activated.

A pilot may at any time after establishing the actual cargo weight interrogate the system to determine the power required for landing and if any special landing techniques are necessary. By activating the destination power switch 23 on the Destination Control Panel 18 the pilot confronts the system with the destination conditions in the same manner as when the destination maximum cargo switch is activated. Switch 55 switches the input of computer 54 to the output of subtract circuit 57. Computer 54 adjust the maximum hover weight signal until the output of the subtract circuit is zero and the hover weight signal equals the gross weight which during the test equals the destination gross weight. Computer 54 also provides the signal $Q_D$ corresponding to the torque required to hover with the destination gross weight, this signal is computed in accordance with Equation 1. Switches 49 and 50 connect computers 30 and 31 in FIG. 5 to the output of computer 54 providing the $Q_D$ signal. Computers 30 and 31 compute the percent maximum torque needed to hover at the destination which is displayed on the torque indicator. If the percent maximum torque required to hover is greater than 75 percent as shown on the go, no-go index 9 the pilot may be required to execute a STOL approach at the airspeed indicated by the STOL airspeed background on the go, no-go index 9. Once the helicopter is within ground effect the pilot can then revert to a hover position for landing. Thus the pilot is forwarned of the need for a STOL type approach.

Figure 7:
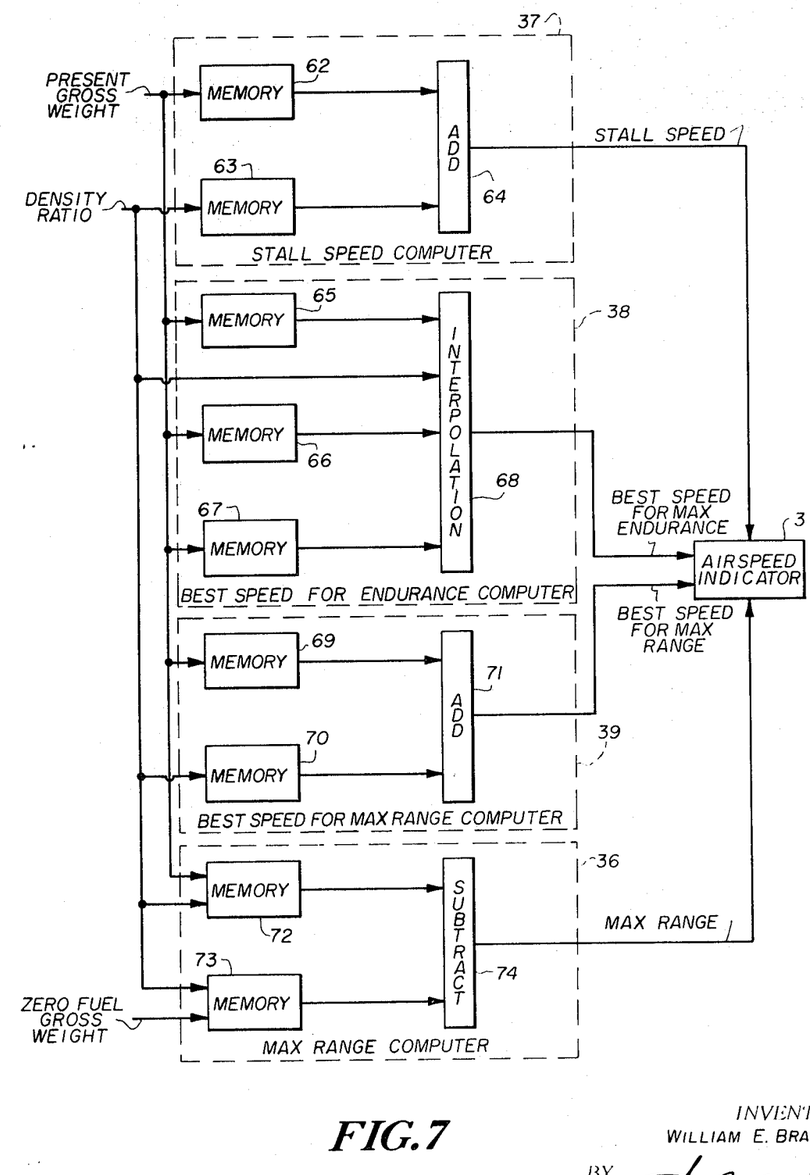
FIG. 7 shows a block diagram of a portion of the system shown in FIG. 3 used in conjunction with the portions shown in FIGS. 5 and 6 to compute and display stall speed, maximum range, best speed for maximum endurance and best speed for maximum range.
Figure 8:
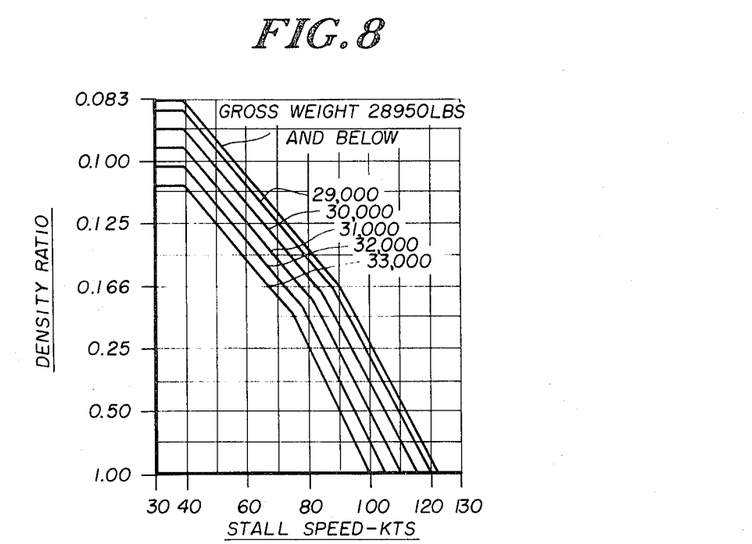
FIG. 8 is a graph showing the relationship between gross weight, density ratio and stall speed of a helicopter.

Referring to FIG. 7 there is shown a portion of the system used for computing and displaying stall speed, maximum range, best speed for maximum range and best speed for maximum endurance. Stall speed is a function of gross weight and density ratio when constant rotor speed is maintained. FIG. 8 is a graph showing a typical relationship between density ratio, gross weight and stall speed. A memory device 63 is provided with the density ratio signal from FIG. 5 and produces a signal corresponding to the stall speed at the density ratio and at a specified gross weight of thirty thousand pounds in accordance with the graph in FIG. 8. Another memory device 62 is provided with the present gross weight signal from FIG. 6 and produces a signal corresponding to a difference in stall speed resulting from a difference between the actual gross weight and thirty thousand pounds. An ADD circuit 64 is connected to the memory devices 62 and 63 and sums the signals therefrom. The ADD circuit 64 has an output connected to the airspeed indicator 3 and provides a signal corresponding to the actual stall speed which is displayed by the movable index 14 on the airspeed indicator 3.

Figure 9:
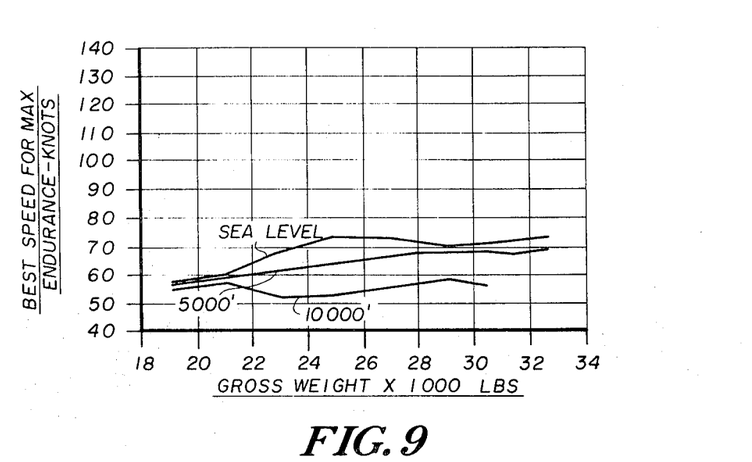
FIG. 9 is a graph showing the relation between gross weight, altitude and best speed of a helicopter for maximum endurance.

Referring to FIG. 9 there is shown the relationship between altitude, gross weight, and best speed for maximum endurance. The family of curves for various altitudes is dissimilar therefore it is necessary to provide memory devices for various altitudes and then interpolate for intermediate altitudes.

In FIG. 7, memory devices 65, 66, and 67 provide signals corresponding to best speed at sea level, five thousand feet and ten thousand feet respectively when confronted with the present gross weight signal in accordance with the curves in FIG. 9. Memory devices 65, 66, and 67 have outputs connected to an interpolation circuit 68 which is responsive to the density ratio signal for interpolating between the three altitudes and providing a signal corresponding to the best speed for maximum endurance at the present altitude and gross weights. The interpolation circuit has an output connected to the airspeed indicator which displays the best speed for maximum endurance as a movable index 15. The interpolation circuit may be a standard interpolating potentiometer having taps excited by the output of the memory devices and a wiper moving in correspondence with altitude.

Figure 10:
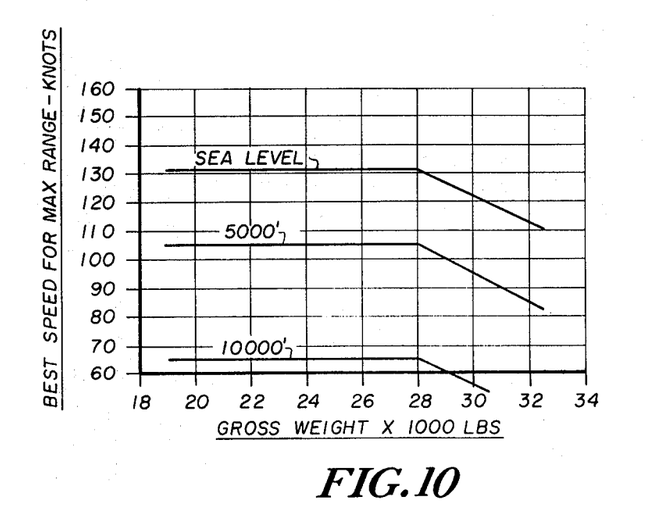
FIG. 10 shows the relationship between gross weight, altitude and best speed of a helicopter for maximum range.

Referring to FIG. 10 there is shown the relationship between altitude, gross weight, and best speed for maximum range. The curves for various altitudes are similar; therefore, only two memory devices are needed. In FIG. 7, memory device 69 provides a signal corresponding to the best speed at five thousand feet altitude in accordance with the curve in FIG. 10 when confronted with a signal corresponding to gross weight. A second memory device 70 provides a signal corresponding to a change in best speed for a change in density ratio when confronted with a signal corresponding to density ratio. Since density ratio corresponds to altitude the signal corresponds to change in best speed for a change in altitude. An ADD circuit 71 is connected to memory devices 69 and 70 and adds the signals therefrom to provide a signal corresponding to the best speed for maximum range. ADD circuit 71 has an output connected to the airspeed indicator 3 and the signal therefrom is displayed by movable index 15.

Figure 11:
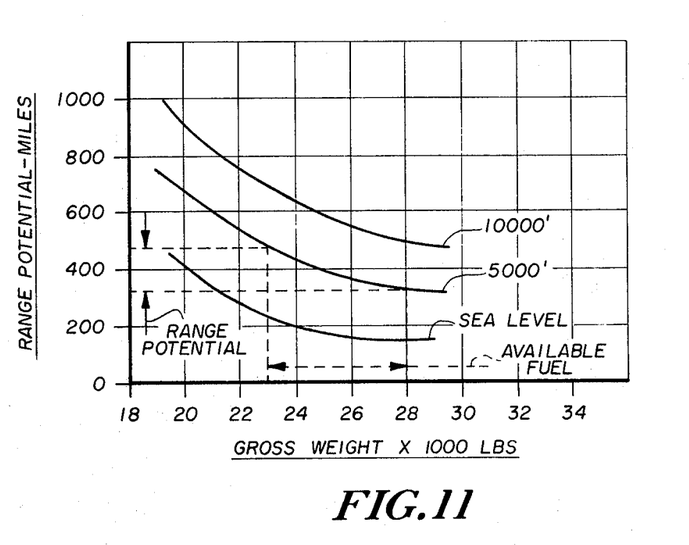
FIG. 11 is a graph showing the range potential of a helicopter for a change in gross weight at a constant altitude.

Referring to FIG. 11 there is shown the relationship between gross weight, altitude, and range potential. In FIG. 7, memory device 72 is provided with the present gross weight signal and the density ratio signal and provides a signal corresponding to maximum range at the present altitude and gross weight. A second memory device 73 is provided with the zero fuel gross weight signal and the density ratio signal and provides a signal corresponding to the range at the present altitude and the zero fuel gross weight. Memory devices 72 and 73 have outputs connected to a subtraction circuit 74 which provides a signal proportional to the difference between the two ranges and thus corresponds to the remaining potential range. The subtraction circuit 74 has an output which is connected to the airspeed indicator on which the remaining potential range is displayed on the digital counter display 13.

To operate the system for a typical mission knob 77 is adjusted to insert airframe weight into the system. The destination conditions of altitude, temperature and fuel reserve are inserted using the adjustment means on control panel 18. The local humidity condition is inserted using switch 22. Subnormal engine adjustment is accomplished while the helicopter is on the ground using knobs 11. The maximum cargo weight is indicated on counter 10. The maximum cargo that may be safely landed at the destination is determined by activation of switch 24 and reading counter 10, if the destination maximum cargo is the restraining value it may be locked into counter 10 by pushing switch 24 into the latch position.

To determine if the helicopter has sufficient power to fly out of ground effect the pilot must increase collective pitch until indicator 2 shows 75 percent of maximum torque, if lift-off is accomplished full power can be applied with assurance of flight out of ground effect. If lift-off does not result the pilot may make a STOL take off if the surrounding area allows. If the area is clear for a STOL take off the collective pitch is increased to a torque beyond 75 percent until lift-off results. At this time the STOL airspeed is read on the STOL airspeed index 9, this airspeed must be attained while the helicopter is in ground effect and be maintained while out of ground effect. The pilot must increase the airspeed to the required amount and then ascend to the desired altitude.

After lift-off the pilot may then determine the actual cargo weight by flying at a specified airspeed and depressing the cargo update switch 16 and reading counter 10 which then indicates the actual cargo weight. After updating the cargo indication the pilot may interrogate the system to determine the power required for landing at the destination by activating switch 23 and reading indicator 2. Indicator 2 indicates the percent of maximum torque required to land and go, no-go index 9 indicates if a STOL approach is necessary and what airspeed is required until the helicopter is within ground effect.

During flight the system also indicates the maximum range, actual airspeed, stall speed, best speed for maximum range and best speed for maximum endurance.

The computer 1 provides a signal corersponding to percent of maximum torque for each engine, actual troque for each engine, actual cargo weight, present gross weigth, stall speed, best speed for maximum endurance, best speed for maximum range and range potential. Indicators 2 and 3 provide means for displaying the signals.

What is claimed is:

1. A system for monitoring reserve capability of a turbine engine, comprising:
    means for providing a signal corresponding to static pressure;
    means for providing a signal corresponding to ambient temperautre;
    first computing means connected to the static pressure means and the temperature means and including means responsive to the ambient temperature signal cooperating with means responsive to the static pressure signal for providing a signal as a function of temperature and pressure corresponding to maximum rated engine torque at the pressure and temperature, and
    means for providing a signal corresponding to torque output of the turbine engine; and
    second computing means connected to the torque output signal means and to the first computing means and responsive to the signals therefrom and including means for providing a signal corresponding to percent of maximum rated torque being produced by the engine.

2. A system as described in claim 1, additionally comprising a torque indicator connected to the computer output and responsive to the signal therefrom for indicating the percent of maximum rated torque for the engine.

3. A system as described in claim 2, in which the computer includes means for applying the torque output signal to the torque indicator and the torque indicator additionally includes means for indicating engine torque output.

4. A system as described in claim 1 in which the first computing means includes:
    a function potentiometer having a resistance contoured to provide a signal corresponding to rated engine torque at ambient conditions and excited by the ambient temperature signal and having a wiper connected to the static pressure signal means and movable thereby in accordance with the static pressure so that the potentiometer provides an electrical signal correspondnig to rated engine torque at the pressure and temperature.

5. A system as described in claim 4, additionally comprising:
    gain adjusting means for adjusting the rated torque signal to compensate for subnormal engine characteristics so that the percent of maximum rated torque signal corresponds to one hundred percent when the engine is producing maximum torque; and
    a limiter connected to the last mentioned means for limiting the rated torque signal to a maximum level which can be safely produced by the engine and having an output providing a limited torque signal.

6. A system as described in claim 1, in which the first computing means additionally includes a limiter for limiting safely the rated torque signal to a maximum level which can be produced safely by the engine.

7. A system as described in claim 1, additionally comprising means for adjusting the rated torque signal to compensate for subnormal engine characteristics so that the percent of maximum rated torque signal corresponds to one hundred percent when the engine is producing maximum torque.

8. A system for computing maximum cargo weight in an aircraft having a turbine engine, comprising:
    means for providing a signal corresponding to static pressure;
    means for providing a signal corresponding to ambient temperature,
    a computer connected to said means and responsive to the signals therefrom and including means for providing a signal as a function of temperature and pressure corresponding to maximum rated engine torque at the pressure and temperature and including means for providing a signal as a function of temperature and pressure corresponding to density ratio:
    means responsive to the maximum rated torque and density ratio signals for providing a signal corresponding to maximum hover weight in accordance with the equation:

$$Q = RKf(W/R)^{3/2}$$

where Q is the maximum rated engine torque, K is a constant for zero aircraft airspeed, W is the maximum hover weight of the aircraft and R is the density ratio;
    means for providing a signal corresponding to weight of fuel on board;
    means for providing a signal corresponding to airframe weight; and
    means connected to the last three mentioned means for subtracting from the maximum hover weight signal the fuel weight signal and the airframe weight signal to provide an output corresponding to the maximum cargo weight.

9. A system as described in claim 8, additionally comprising indicating means responsive to the maximum cargo weight signal for indicating the maximum cargo weight.

10. A system as described in claim 8, in which the last mentioned means comprises:
    a signal source providing a signal corresponding to maximum cargo weight;
    a first ADD circuit for receiving the maximum cargo weight signal and the airframe weight signal and having an output providing a signal corresponding to the sum of the received signals;
    a second ADD circuit connected to the output of the first ADD circuit and the fuel weight means for receiving and summing the signals therefrom and having an output providing a signal corresponding to the maximum gross weight; and
    a subtract circuit for receiving the maximum gross weight signal and the maximum hover weight signal and having an output for providing a signal corresponding to the difference, the signal source being connected to the output of the subtract circuit and responsive to the signal therefrom to adjust the maximum cargo weight signal so that the maximum gross weight signal equals the maximum hover weight signal.

11. A system as described in claim 8, additionally comprising:
means for providing a signal corresponding to torque output of the engine; and means for substituting the engine torque output signal for the rated torque signal, while operating at a predetermined speed whereby the maximum cargo weight signal becomes an actual cargo weight signal.

12. A system as described in claim 8, additionally comprising:
means for providing signals corresponding to density ratio and rated engine torque at selected destination conditions of altitude, temperature, humidity and fuel reserve requirement; and
means connected to the aforementioned means and responsive to the signals therefrom for providing a signal corresponding to maximum cargo weight that can be safely landed at the mission destination.

13. A system as described in claim 12, additionally comprising means connected to the airframe weight signal means and responsive to the signal therefrom for providing a signal corresponding to percent maximum torque needed to hover at the mission destination.

14. A system as described in claim 12, in which the maximum cargo weight signal means comprises:
switching means responsive to a destination maximum cargo interrogation command for substituting a density ratio signal, and a rated engine torque signal corresponding to conditions of altitude and temperature at the destination and a destination fuel reserve requirement signal for the actual density ratio signal, the actual rated engine torque signal and the actual fuel weight signal respectively, whereby the maximum cargo weight signal becomes the maximum destination cargo weight signal.

15. A system as described in claim 8, in which the computer comprises:
a first function potentiometer having a resistance contoured to provide a signal corresponding to rated engine torque at ambient conditions and excited by the ambient temperature signal and having a wiper connected to the static pressure signal means and movable thereby in accordance with the static pressure so that the potentiometer provides a signal corresponding to rated engine torque at the pressure and temperature; and
a second function potentiometer having a resistance contoured to provide a signal corresponding to density ratio and excited by the ambient temperature signal and having a wiper connected to the static pressure signal means and movable thereby in accordance with static pressure so that the potentiometer provides a signal corresponding to the density ratio at the pressure and temperature.

16. A mission capability indicating system for a helicopter having turbine engines, comprising:
means for providing a signal corresponding to static pressure;
means for providing a signal corresponding to ambient temperature;
means for providing a signal corresponding to torque output of the turbine engines;
an evacuated diaphragm that expands and contracts in corresponding relationship to the static pressure;
a function potentiometer connected to the ambient temperature signal means and excited by the signal therefrom having a wiper connected to the evacuated diaphragm so that the wiper moves in corresponding relationship with the static pressure and provides a signal corresponding to rated engine torque at the ambient temperature and static pressure;
a second function potentiometer connected to the ambient temperature signal means and excited by the signal therefrom having a wiper connected to the evacuated diaphragm so that the wiper moves in corresponding relationship with the static pressure and provides a signal corresponding to density ratio at the ambient temperature and static pressure;
a gain adjustment means connected to the wiper of the first potentiometer for adjusting the level of the rated engine torque signal to compensate for subnormal engine operation and having an output providing a signal corresponding to available engine torque;
a limiter connected to the output of the gain adjustment means for limiting the available engine torque signal to a maximum level that may be safely handled by the turbine engine and having an output providing a signal corresponding to maximum available torque;
a percent of maximum torque computer connected to the output of the limiter and the turbine engine torque signal means and responsive to the signals therefrom for computing the percent of maximum torque being produced and having output providing a signal corresponding thereto;
an indicator connected to the output of the percent of maximum torque computer and responsive to the signal therefrom for indicating the percent of maximum torque;
means for providing a signal corresponding to the weight of fuel on board;
means for providing a signal corresponding to airframe weight;
a computing means connected to the output of the limiter and the wiper of the second potentiometer and responsive to the signal therefrom for computing a signal corresponding to the maximum hover weight and having an output providing a signal corresponding thereto;
a subtract circuit connected to the output of the computing means and receiving the signal corresponding to maximum gross weight and having an output providing a signal corresponding to the difference between the maximum hover weight and the gross weight;
a variable signal source connected to the output of the subtract circuit and responsive to the difference signal for providing a signal corresponding to maximum cargo weight;
a first ADD circuit for receiving and summing the maximum cargo weight signal and the airframe weight signal and having an output providing the signal corresponding to the zero fuel gross weight;
a second ADD circuit for receiving and summing the zero fuel gross weight signal and the fuel weight signal and having an output corresponding to the maximum gross weight which is connected to the subtract circuit, whereby the variable signal source adjusts the maximum cargo weight signal until the maximum gross weight signal equals the maximum hover weight signal, the indicator also receives the cargo weight signal and displays the maximum cargo weight;
switch means for substituting the engine torque output signal in place of the maximum available torque signal while flying at a specified airspeed and switching the computer to a memory for the specified airspeed, whereby the computer provides a signal corresponding to the actual hover weight and the maximum cargo weight signal becomes an actual cargo weight signal;
a stall speed computer means connected to the output of the second ADD circuit and the wiper of the second potentiometer and responsive to the signals therefrom for providing an output signal corresponding to stall speed;

a best speed for maximum-endurance computer connected to the output of the second ADD circuit and to the wiper of the second potentiometer and responsive to the signals therefrom for providing an output signal corresponding to the best speed for maximum endurance;

a best speed for maximum range computer connected to the output of the second ADD circuit and to the wiper of the second potentiometer and responsive to the signals therefrom for providing an output signal corresponding to the best speed for maximum range;

a maximum range computer connected to the output of the second ADD circuit, the output of the first ADD circuit and the wiper of the second potentiometer and responsive to the signals therefrom for providing a signal corresponding to maximum range;

an airspeed indicator receives the stall speed signal, the best speed for maximum endurance signal, the best speed for maximum range signal and the maximum range signal and displays the stall speed, the best speed for maximum endurance, the best speed for maximum range and the maximum range;

a destination control panel having means for providing signals corresponding to density ratio and rated engine torque at selected destination conditions of altitude, temperature, humidity and fuel reserve requirements;

means connected to the control panel and responsive to the signals therefrom for providing a signal corresponding to maximum cargo weight that can be safely landed at the mission destination; and means connected to the destination control panel and the airframe weight signal means and responsive to the signals therefrom for providing a signal corresponding to percent of maximum torque needed to hover at the mission destination.

17. A system for computing actual cargo weight in an aircraft having a turbine engine comprising:

means for providing a signal corresponding to static pressure;

means for providing a signal corresponding to ambient temperature;

a computer connected to said means and responsive to the signals therefrom and including means for providing a signal as a function of temperature and pressure corresponding to density ratio;

means for providing a signal corresponding to torque output of the engine;

means connected to the torque output signal means and to the computer and responsive to the torque output and density ratio signals for providing a signal corresponding to actual aircraft gross weight in accordance with the equation:

$$\acute{Q} = R\acute{K}f(\acute{W}/R)^{3/2}$$

where $\acute{Q}$ is the torque output of the engine, $\acute{K}$ is a constant for a predetermined airspeed of the aircraft, $\acute{W}$ is the actual aircraft gross weight and $R$ is the density ratio;

means for providing a signal corresponding to weight of fuel on board;

means for providing a signal corresponding to airframe weight; and means connected to the last three mentioned means for subtracting from the actual aircraft gross weight signal the fuel weight signal and the airframe weight signal to provide an output corresponding to the actual cargo weight.

18. A system as described in claim 17 in which the last mentioned means comprises:

a variable signal source for providing a signal;

a first ADD circuit connected to the variable signal source and to the airframe weight signal means for summing the signals therefrom and providing a summation signal;

a second ADD circuit connected to the first ADD circuit and to the fuel weight signal means for summing the signals therefrom and providing a signal corresponding to the computed gross weight;

a subtract circuit connected to the actual aircraft gross weight signal means and to the second ADD circuit and responsive to the signals therefrom and having an output for providing a difference signal;

and means connecting the variable signal source to the output of the subtract circuit and responsive to the difference signal for adjusting the variable signal source until the computed gross weight signal and the actual gross weight signal are equal so that the signal from the variable signal source corresponds to the actual cargo weight.

19. A system as described in claim 18, additionally comprising:

a first memory device connected to the output of the second ADD circuit and responsive to the signal therefrom for providing a signal corresponding to helicopter stall speed at the actual gross weight and a specified altitude;

a second memory device connected to the computer and responsive to the density ratio signal therefrom for providing an output corresponding to a change in stall speed resulting from a change in density ratio from the density ratio at the specified altitude;

an ADD circuit for receiving and summing the signals from the first and second memory devices and having an output providing a signal corresponding to the actual stall speed;

a third memory device connected to the output of the second ADD circuit and responsive to the signal therefrom for providing a signal corresponding to the best speed for maximum endurance at a specified minimum altitude;

a fourth memory device connected to the output of the second ADD circuit and responsive to the signal therefrom for providing a signal corresponding to the best speed for maximum endurance at a specified mid-altitude;

a fifth memory device connected to and responsive to the signals from the output of the second ADD circuit for providing a signal corresponding to the best speed for maximum endurance at a maximum altitude;

an interpolation circuit for receiving the signals from the last three mentioned memory devices and the density ratio signal from the computer and responsive to the density ratio signal to interpolate between the signals from the memory devices and provide an output signal corresponding to the best speed for maximum endurance at the actual altitude and gross weight;

a sixth memory device connected to the output of the second ADD circuit and responsive to the signal therefrom for providing a signal corresponding to the best speed for maximum range at the actual gross weight and a specified altitude;

a seventh memory device connected to the computer and responsive to the signal therefrom for providing a signal corresponding to a change in best speed for maximum range resulting from a change in density ratio from the density ratio at the specified altitude;

an ADD circuit for receiving and summing signals from the last two mentioned memory devices and having an output providing a signal corresponding to the best speed for maximum range;

an eighth memory device connected to the output of the second ADD circuit and the computer circuit and responsive to the signals therefrom for providing an output signal corresponding to maximum range at the actual gross weight and density ratio;

a ninth memory device connected to the output of the first ADD circuit and the computer circuit and responsive to signal therefrom for providing a signal corresponding to maximum range at a zero fuel gross weight and the actual density ratio; and a subtract circuit for receiving the signals from the last two mentioned memory devices and for subtracting the zero fuel gross weight maximum range signal from the actual gross weight maximum range signal to provide a signal corresponding to the maximum range available for a change in gross weight corresponding to the difference between the actual gross weight and the zero fuel gross weight.

References Cited

UNITED STATES PATENTS

| | | | |
|---|---|---|---|
| 3,181,353 | 5/1965 | Brahm et al. | 73—117.3 |
| 3,195,349 | 7/1965 | Hage | 73—117.3 |
| 3,272,004 | 9/1966 | Havel | 73—117.3 |
| 3,287,965 | 11/1966 | Brahm et al. | 73—117.3 |

DONALD O. WOODIEL, Primary Examiner